United States Patent [19]

Böhme et al.

[11] 4,417,817

[45] Nov. 29, 1983

[54] VOLUMETRIC MEASUREMENT OF PARTICLES

[75] Inventors: Rolf C. Böhme, Kyalami; Ian D. van Zyl, Randburg; Max M. Lazerson, Northcliff, all of South Africa

[73] Assignee: General Mining Union Corporation, Limited, South Africa

[21] Appl. No.: 229,053

[22] Filed: Jan. 26, 1981

[30] Foreign Application Priority Data

Jun. 19, 1980 [ZA] South Africa ................... 80/3656
Jul. 15, 1980 [ZA] South Africa ................... 80/4250

[51] Int. Cl.³ ................... G01B 11/28; G01B 11/00
[52] U.S. Cl. ................... 356/380; 356/390
[58] Field of Search ............. 356/376, 372, 379–380, 356/386, 390, 394; 250/221, 560

[56] References Cited

U.S. PATENT DOCUMENTS

| 3,513,444 | 5/1970 | Henderson et al. | 356/379 |
| 3,870,890 | 3/1975 | Binks et al. | 250/560 |
| 3,970,846 | 7/1976 | Schofield, Jr. et al. | 250/221 |
| 3,997,269 | 12/1976 | Moulton | 250/560 |
| 4,025,201 | 5/1977 | Deane | 356/240 |
| 4,192,613 | 3/1980 | Hammar | 356/386 |
| 4,267,443 | 5/1981 | Carroll et al. | 250/560 |

FOREIGN PATENT DOCUMENTS

| 2729576 | 1/1979 | Fed. Rep. of Germany | 356/376 |
| 956636 | 4/1964 | United Kingdom | 250/560 |
| 1421550 | 1/1976 | United Kingdom | 356/380 |
| 1479972 | 7/1977 | United Kingdom. | |
| 998312 | 7/1965 | United Kingdom. | |
| 1131411 | 10/1968 | United Kingdom. | |
| 1196274 | 6/1970 | United Kingdom. | |
| 1403572 | 8/1975 | United Kingdom. | |
| 1403573 | 8/1975 | United Kingdom. | |

Primary Examiner—William H. Punter
Attorney, Agent, or Firm—Lowe, King, Price & Becker

[57] ABSTRACT

For measuring the volume of a particle, for example in ore sorting, the particle is caused to move past radiators which illuminate the particle in two transverse directions. Detectors provide measures of the dimensions of the particle in the transverse directions in each of a number of adjacent zones which extend through the particle in its direction of movement. For each zone a volume measurement is derived from the product of the dimensional measurements and the various volume measurements are accumulated to obtain the final volume measurement.

The dimensional measurements may be made in each zone in four or more transverse directions, and may be made by means of scanning cameras to obtain a more accurate final volume measurement.

9 Claims, 6 Drawing Figures

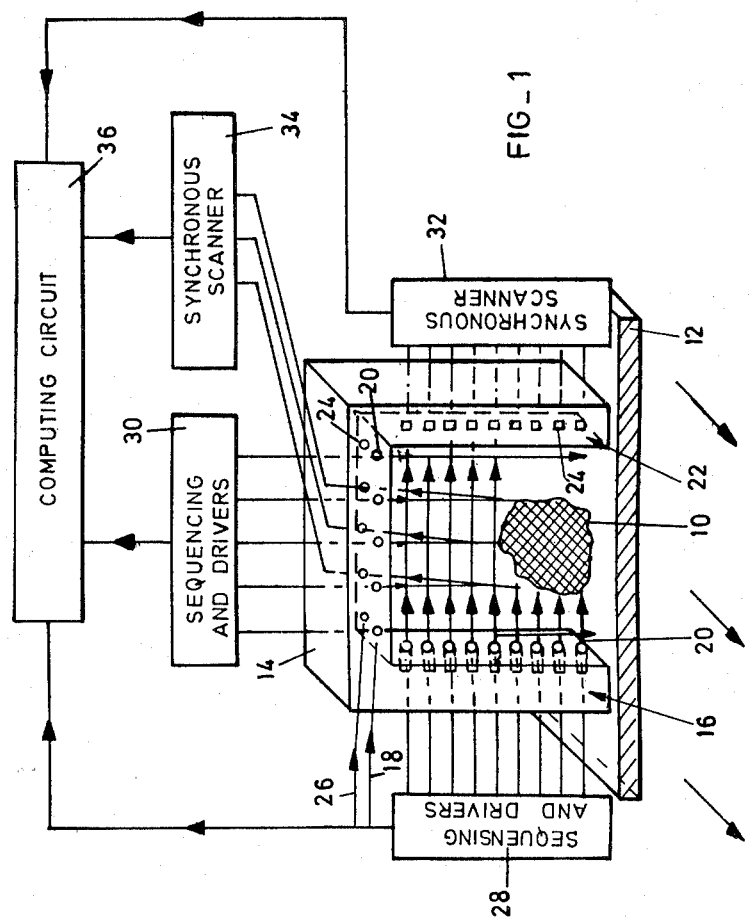
FIG_1

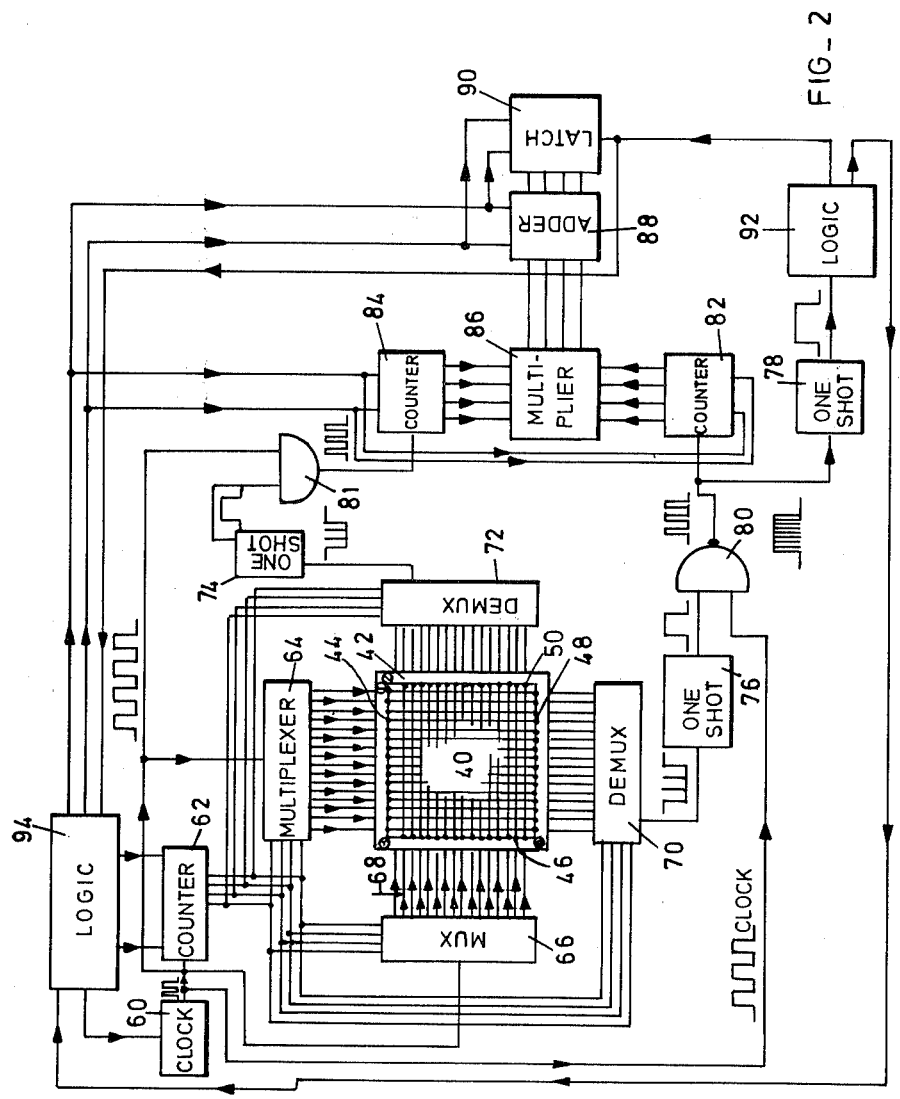

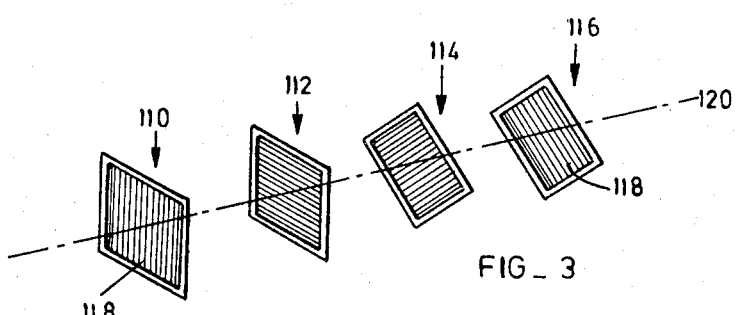
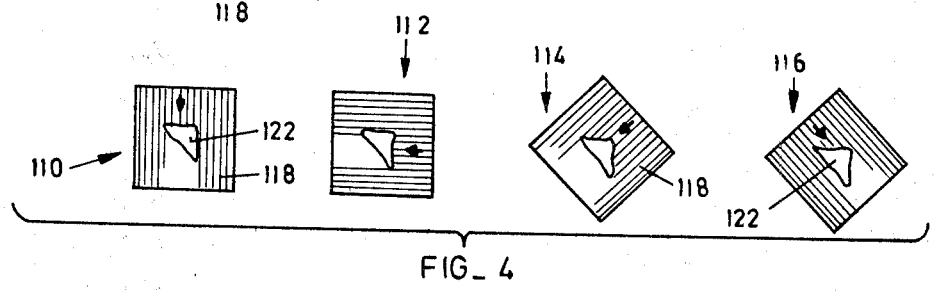
FIG_3
FIG_4
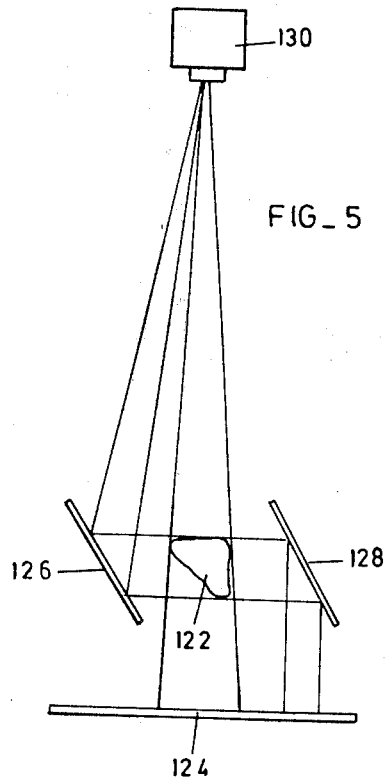
FIG_5
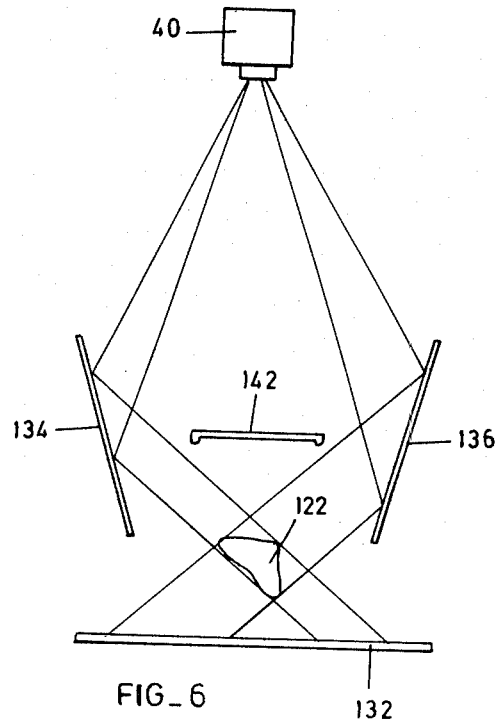
FIG_6

VOLUMETRIC MEASUREMENT OF PARTICLES

FIELD OF THE INVENTION

This invention relates to the volumetric measurement of particles and is particularly suited for use in a sorting process.

BACKGROUND TO THE INVENTION

In certain processes relating to the sorting of particulate material e.g. one sorting, it is necessary to obtain a measurement of a certain property e.g. radioactivity on a per unit volume or mass basis for each particle. This creates the need for some means of rapidly obtaining a measure of the volume of rapidly moving individual particles.

It is known to pass the particles through a light gate including a plurality of closely spaced light beams which are located in a common plane and are focused on to light detectors. The number of beams which are broken by a particular particle in whatever time it takes the particle to traverse the screen enables a computer connected to the screen to determine a two dimensional shadow area of the particle. The area is then multiplied by an empirically determined factor to arrive at the theoretical volume and mass of the particle.

A problem which often leads to substantial radiation measurement errors with this sorting method is that no accurate compensation is made for the three dimensional shape of the particle. For example, the radioactive self absorption and radiation shadow of a cubic particle as seen by a planar radiation detector is greatly different from that of a relatively flat particle containing the same amount of radioactive material and having roughly the same physical two dimensional shadow area as the cubic particle and may well lead to rejection of the cubic particle even though it is of acceptable grade.

SUMMARY OF THE INVENTION

A method of obtaining a volumetric measurement of a particle according to the invention includes the steps of associating with the particle a plurality of contiguous zones, obtaining, for each of the zones, a measure of the volume of the portion of the particle within the zone, and accumulating the measures to derive a first volumetric measurement of the particle.

Further according to the invention the zones extend transversely and preferable at right angles to a first direction along the particle.

Further according to the invention the zones are parallel to one another. Preferably each zone has the same depth, as measured in the first direction.

Further according to the invention measurements are obtained within each zone of the projected widths of the particle in a first pair of directions which are transverse to each other.

If the two directions are at right angles to each other the product of the projected widths gives a measure of the cross-sectional area of the particle within the zone, which when multiplied by the depth of the zone, gives a measure of the volume of the portion of the particle within the zone.

Measurements of the projected widths in other i.e. non-coincident directions may also be made to provide some means of compensating for cross-sectional shapes which are not substantially rectangular, or which are substantially rectangular but which are not aligned with the first pair of directions.

It should be noted that if all the zones have the same depth the cross-sectional areas may be accumulated and the sum is then multiplied by the depth.

In addition, if the relative volumetric measurements of different particles are important then there is no need to multiply the sum of the cross-sectional areas by the depth for the respective sums of different particles will be in the same relationship to one another as the respective volumes.

Further according to the invention the particle is moved in the first direction past a reference location, and the volume measurements for the respective zones are made as they successively pass the location.

Apparatus according to the invention includes means for obtaining, for each of a plurality of contiguous zones associated with the particle, a measure of the volume of the portion of the particle within the zone, and means for accumulating the measures to derive a volumetric measurement of the particle.

Further according to the invention the volume measuring means includes means for obtaining measurements within each zone of the projected widths of the particle in at least two directions transverse to each other, and means for obtaining the product of the two measurements to derive a measure of the cross-sectional area of the particle within the zone.

Preferably the volume measuring means obtains measurements within each zone of the projected widths of the particle in a first pair of directions at right angles to each other, and in a second pair of directions at right angles to each other, the two pairs of directions being non-coincident.

The means for measuring the projected width may comprise a plurality of collimated radiation sources arranged to illuminate in at least two directions the portion of the particle within a zone, and a plurality of detector means, each of which is responsive to the radiation from one of the sources, for determining the number of sources which actually illuminate the particle.

The radiation sources and detector means may be energized sequentially and in synchronism.

Alternatively the means for measuring the projected width includes optical measuring means, and means for projecting a two dimensional shadow image of the particle from at least two directions on to the optical measuring means.

The optical measuring means may comprise a scanning camera.

BRIEF DESCRIPTION OF THE DRAWINGS

The invention is described by way of examples with reference to the drawings in which:

FIG. 1 is a schematic perspective view, partly sectioned, of a first embodiment of the invention, FIG. 2 illustrates a second embodiment of the invention, including a diagram of a computing circuit used in the invention, FIG. 3 schematically illustrates a preferred principle of the invention, FIG. 4 illustrates the principle of FIG. 3 in operation, and FIGS. 5 and 6 respectively illustrate further variations of the invention.

DETAILED DESCRIPTION OF THE INVENTION

The embodiment of the invention shown in FIG. 1 is designed for the volumetric measurement of a particle 10 located on a moving conveyor belt 12 which is made from a black non-reflective material. FIG. 1 illustrates only one particle but in practice the belt may carry a plurality of rows of particles with the particles in each row being spaced from one another and with the rows also being spaced from each other.

Mounted above the belt is a frame 14 having vertical and horizontal arrays 16 and 18 respectively of partially collimated high intensity pulsed light emitting diodes 20. An array 22 of highly collimated photo transistor light sensors 24 is arranged vertically on the frame opposing the array 16, with each sensor corresponding to a particular diode 20.

Similar sensors are arranged in a horizontal array 26 with each sensor being adjacent and being associated with a particular diode 20 in the array 18.

Each diode has a wider collimation angle than its associated highly collimated photo transistor so that, with regard to the horizontal arrays 18 and 26, each photo transistor can detect light originating from its associated diode and reflected at any point above the belt surface and below the upper limb of the frame 14.

The diodes in each array 16 and 18 are sequentially pulsed by drivers 28 and 30 respectively and the corresponding arrays 22 and 26 of photo transistors are synchronously scanned by means of scanners 32 and 34 respectively. Thus each transistor is only responsive to light which is emitted by its corresponding light emitting diode.

Consequently as the particle 10 is moved by the belt past the frame successive zones of the particle, which extend transversely to its direction of travel, are illuminated and scanned. In this way, by suitable selection of the synchronous sequential pulsing and scanning rate a scan resolution of approximately 5 mm can be achieved using commercially available very small light emitting diodes and photo transistors.

Thus, by counting the number of transistors in the vertical array 22 which are not illuminated directly in each scan by the diodes in the array 16 the projected height of the particle over a zone approximately 5 mm deep is determined.

Similarly, by counting the number of transistors in the horizontal array 26 which are illuminated by light emitted by the diodes in the array 18 and then reflected from the particle the projected width of the particle over the same zone is determined.

The product of the projected height and width is a measure of the projected cross-sectional area of the portion of the particle within the zone i.e. in a direction which is transverse to the direction of travel of the particle.

The data derived in this way from the various arrays is fed to a computing circuit 36, hereinafter described with reference to FIG. 2. By suitable timing of the scanning rates the projected cross-sectional area of contiguous 5 mm deep zones or slices of the particle are determined and by summing these projected areas of the zones along the length of the particle in its direction of travel the projected volume of the particle is derived.

The arrangement shown in FIG. 2 is intended for the volumetric measurement of a particle 40 projected in free flight from the end of a conveyor belt through a frame 42. The frame carries arrays of light emitting diodes and photo transistors which may be identical to those of FIG. 1, i.e. arranged to be responsive to directly transmitted light and to reflected light. The arrays may alternatively be responsive to reflected light only but it is most convenient if the arrays correspond to the vertical arrays 16 and 22 of FIG. 1 i.e. the system is based on the detection of directly transmitted light.

Thus in FIG. 2 the numerals 44 and 46 denote horizontal and vertical arrays respectively of light emitting diodes, and the numerals 48 and 50 denote corresponding horizontal and vertical arrays respectively of photo transistor sensors.

In other respects the operation of the arrangement is analogous to that of FIG. 1 and will not be elaborated on for, as before, the projected cross-sectional area of each of a plurality of contiguous zones of the particle is obtained, with the zones extending successively in the direction of travel of the particle, and these areas are summed to obtain a measure of the projected volume of the particle.

Consequently the following description is largely confined to a discussion of the manner in which the circuitry, designated generally as 36 in FIG. 1, works.

The circuitry includes a clock oscillator 60, a four bit binary counter 62, two 16 channel analog multiplexers 64 and 66 associated with the horizontal and vertical arrays of diodes respectively, high power driver circuits 68, two corresponding 16—channel de-multiplexers 70 and 72 respectively, retriggerable one-shots (monostable multivibrators) 74, 76 and 78, AND gates 80 and 81, four bit binary counters 82 and 84, a multiplier 86, a parallel adder 88, a latch 90 and logic units 92 and 94 respectively. The latter logic unit is used for gating, reset, and count enable, logic. The former unit is used to detect the length of the particle in its direction of travel. The clock oscillator 60 drives the 4-bit binary counter 62. The 4-bit output of the binary counter 62 is decoded by the 16 channel analog multiplexer 66 which sequences the diodes in the vertical array 46, and by the multiplexer 64 which sequences the diodes in the horizontal array 44. The outputs of the multiplexers are fed to the high power driver circuits 68 which drive the light emitting diodes to give very high intensity light pulses.

The action of each multiplexer is sequentially to pulse the light emitting diodes in each array as described. The associated light detecting photo transistor outputs are fed in parallel to the 16 channel demultiplexers 72 in the vertical plane and 70 in the horizontal plane. As these demultiplexers are synchronously driven by the binary counter 62 the pulse sequence output of the demultiplexers corresponds to the sequential pulsing of the respective diode arrays, and a high or low logic pulse is obtained from each photo transistor depending on whether it is obscured or not.

The outputs of the demultiplexers are passed to the retriggerable one shots 76 and 74, respectively, setting the width and height of the particle. The width pulse is used to gate the clock pulse through the AND gate 80 and the height pulse gates the clock pulse through the AND gate 81. The outputs of the gates are passed to the counter 84 for the vertical plane, and to the counter 82 for the horizontal plane.

The gating-, reset- and count enable logic section 94 resets the binary counters at the beginning of each scan, and stops the binary counters at the end of each scan cycle.

Thus at the end of each scan cycle a count corresponding to the number of photo transistors obscured in the vertical plane is stored in the binary counter 82 and a count corresponding to the number of photo transistors obscured in the horizontal plane is stored in the binary counter 84. The binary outputs of these counters are fed to the 4-bit×4-bit multiplier system 86, and the 16 bit output of this multiplier, corresponding to the projected cross-sectional area of a 5 mm long slice of the particle is passed to the incremental parallel adder system 88. The incremental adder system is reset to zero by the gating-reset- and count enable logic system 94 when an incoming particle is first detected by the photo transistors, and a 16-bit multiplier product representing the cross-sectional area of a 5 mm slice is then added incrementally, or accumulated, at the end of each sequential scan of the particle, the total summation over the length of the particle thus being the projected volume of the particle. After the end of the particle has been detected by the particle length logic unit 92, the output latch 90 is enabled and the output of this latch representing the projected particle volume is then available for further processing as required.

The circuit elements and arithmetic and logic blocks shown in FIG. 2 are all standard circuit elements well known to those skilled in the digital electronic art, so full circuit details are not given. The system shown comprises a 16 element array, with a corresponding electronic system, but this array can obviously be expanded to arrays with more elements.

The systems as described provide a volumetric measurement, in the nature of a measurement of the projected volume, of each particle. If desired an emperical factor can be applied to determine the mass of the particle.

The FIGS. 1 and 2 embodiments have been described with reference to measurements of projected widths made, in each zone, only in two transverse directions.

This approach only gives a first approximation to the volume of a particle and, when the particle has an irregular shape, the volume measurement can be in error by a large margin. For example, consider a particle 122 which is triangular in cross section and which is caused to move on a path 120 through a first pair of light gates 110 and 112 at right angles to each other, and a second pair of light gates 114 and 116 also at right angles to each other and displaced through 45° relatively to the first pair of gates. This arrangement is illustrated in FIGS. 3 and 4.

Each light gate is illustrated schematically but in practice is similar to that shown in FIG. 2 and its data may be processed in a similar way to that described. Also it should be mentioned that the gates or frames of FIG. 3 are shown spaced from each other for clarity of illustration only and, in practice, the first pair of gates are coplanar, as in FIG. 2, as are the second pair of gates, and the two pairs of gates abut each other. Apart from saving space and reducing the measurement time this has the advantage that errors due to rotation of the particle as it moves from the first pair to the second pair of gates are eliminated.

The gates 110, 112 and 114 all read the maximum projected widths of the particle while the gate 116 reads the relatively lower projected height of the particle. It follows that a volume determination based on the measurements of the first two gates only would be in error whereas a volume measurement based on the measurements of the second pair of gates is more accurate. This second volume measurement i.e. the lower of the two, is thus taken as the volume of the particle.

Clearly an even more accurate determination of the volume is obtained when all four measurements are analyzed in an attempt to obtain an idea of the cross-sectional shape of the particle and this may be accomplished, for example, by statistical methods.

It should also be pointed out that with the FIG. 2 embodiment, which forms the basis for the principle embodied in FIGS. 3 and 4, the light emitting diodes may be substituted by a single light source which extends over the length of the leg of the gate frame and collimating apertures above the photo transistors to provide the beam effect.

When light emitting diodes are used then, due to the physical dimensions of the light emitting diodes, the measurements of the particle size are taken in steps of approximately 5 mm. This is adequate for large particles e.g. in excess of 25 mm, but inadequate for particles of the order of 10 mm. For these particles measurements have to be taken in discrete steps of the order of 1 mm.

A resolution of this magnitude may be achieved with the aid of a scanning camera, or other optical system, as illustrated schematically in FIGS. 5 and 6.

FIG. 5 illustrates an upwardly directed light source 124, two inclined parallel mirrors 126 and 128 and a scanning camera 130.

The camera sees two shadow images of the particle 122 which are at right angles to each other as the particle passes through the gate. The first image is a direct shadow as the particle moves over the light source 124 and the second an image reflected from the mirror 126 via the mirror 128. The circuitry of FIG. 2 is readily adapted for connection to the camera to determine the apparent volume of the particle from the photographed images. This arrangement is approximately equivalent to the information obtained from the frames 110 and 112 in FIGS. 3 and 4 and for further accuracy the FIG. 6 arrangement is used in series with that of FIG. 5.

The FIG. 6 arrangement consists of a light source 132, two angled mirrors 134 and 136, a scanning camera 140 and a light shield 142. In this arrangement no direct shadow image of the particle 122 is seen by the camera and the reflected images that are photographed are seen by the camera on the mirrors 134 and 136 at 45° relatively to those seen by the camera 130.

The mirror 134, in this example, provides the volumetric correction measurement provided by the gate 116 in the embodiment of FIGS. 3 and 4.

The scanning cameras 130 and 140 operate on scan lines which are separated by small fractions of a millimeter. The resolution is thus greatly improved and consequently the volume measurements are made with greater accuracy.

We claim:

1. Apparatus for obtaining a volumetric measurement of an article comprising a radiation imaging structure having a first plurality of collimated radiation sources arranged to irradiate in a first direction a portion of the article within a zone, a first plurality of radiation detectors each of which is responsive to the radiation from a respective one of the first plurality of sources, first counting means for determining the number of said first plurality of sources whose radiation impinges on the article thereby to derive a first measurement of a projection of a first dimension of the article in said first direction, a second plurality of radiation sources arranged to irradiate the portion of the article within said zone in a second direction, a second plurality of radiation detectors each of which is responsive to the radiation from a respective one of the second plurality of sources, second counting means for determining the number of said plurality of sources whose radiation impinges on the article thereby to derive a second measurement of a projection of a second dimension of the article in said second direction, first and second multiplexing means for sequentially driving said first and second pluralities of radiation sources, respectively, to generate sequential radiation beams, first and second demultiplexing means synchronized with said first and second multiplexing means, respectively, for sequentially sampling said first and second pluralities of radiation detectors to provide respective signals to said first and second counting means representing the number of sources of said first and second pluralities of sources whose radiation impinges on the portion of the article, multiplying means for obtaining the product of the numbers in said first and second counting means thereby to derive a measurement of the volume of the portion of the article within the zone, accumulating means for accumulating measurements of the volume portions of the article thereby to derive a volumetric measurement of the article, and further comprising clock means generating a repetitive signal and a third counter means driven thereby for providing output signals controlling operation of said first and second multiplexing means and said first and second demultiplexing means.

2. Apparatus according to claim 1 wherein said accumulating means comprises adding means connected to said multiplying means, logic means providing an output signal after passage of the article through said zone, and latch means connected to said adding means for storing the sum therein responsive to said output signal of said logic means.

3. Apparatus according to claim 1 wherein said first and second directions are orthogonal to one another.

4. Apparatus according to claim 1 wherein at least one of said first and second pluralities of sources comprises a single light source and a plurality of collimating apertures disposed between said light source and the corresponding plurality of radiation detectors.

5. Apparatus according to claim 1 further comprising compensating means for compensating for errors in the volumetric measurement due to lack of alignment between peripheral edges of an irregularly shaped cross-section of an article and said first and second directions.

6. Apparatus according to claim 5 wherein said compensating means comprises a further radiation imaging structure for obtaining additional third and fourth measurements of projections of third and fourth dimensions of the article in third and fourth directions, said third and fourth directions being non-coincident with said first and second directions.

7. Apparatus according to claim 5 wherein said first and second directions are substantially orthogonal to each other and wherein said article having an irregularly shaped cross-section is a non-rectangularly shaped article.

8. Apparatus according to claim 1, further comprising first and second monostable connecting means responsive to said first and second demultiplexing means, respectively, for providing first and second output signals having time durations proportional to the number of sources in said first and second pluralities of sources whose radiation impinges on the article, and first and second gating means enabled by the output signals of said first and second monostable means to pass a number of pulses, generated by said clock means and representative of the number of sources of said first and second pluralities of sources whose radiation impinges on the article, to said first and second counter means, respectively.

9. Apparatus for obtaining a volumetric measurement of an article comprising a radiation imaging structure having a first plurality of collimated radiation sources arranged to irradiate in a first direction a portion of the article within a zone, a first plurality of radiation detectors each of which is responsive to the radiation from a respective one of the first plurality sources, first counting means for determining the number of said first plurality of sources whose radiation impinges on the article thereby to derive a first measurement of a projection of a first dimension of the article in said first direction, a second plurality of radiation sources arranged to irradiate the portion of the article within said zone in a second direction, a second plurality of radiation detectors each of which is responsive to the radiation from a respective one of the second plurality of sources, second counting means for determining the number of said plurality of sources whose radiation impinges on the article thereby to derive a second measurement of a projection of a second dimension of the article in said second direction, first and second multiplexing means for sequentially driving said first and second pluralities of radiation sources, respectively, to generate sequential radiation beams, first and second demultiplexing means synchronized with said first and second multiplexing means, respectively, for sequentially sampling said first and second pluralities of radiation detectors to provide respective signals to said first and second counting means representing the number of sources of said first and second pluralities of sources whose radiation impinges on the portion of the article, multiplying means for obtaining the product of the numbers in said first and second counting means thereby to derive a measurement of the volume of the portion of the article within the zone, accumulating means for accumulating measurements of the volume portions of the article thereby to derive a volumetric measurement of the article, clock means generating a repetitive signal and a third counter means driven thereby for providing output signals controlling operation of said first and second multiplexing means and said first and second demultiplexing means, first and second monostable connecting means responsive to said first and second demultiplexing means, respectively, for providing first and second output signals having time durations proportional to the number of sources in said first and second pluralities of sources whose radiation impinges on the article, and first and second gating means enabled by the output signals of said first and second monostable means to pass a number of pulses, generated by said clock means and representative of the number of sources of said first and second pluralities of sources whose radiation impinges on the article, to said first and second counter means, respectively.

* * * * *